US010127227B1

(12) United States Patent
Badr et al.

(10) Patent No.: US 10,127,227 B1
(45) Date of Patent: Nov. 13, 2018

(54) PROVIDING ACCESS TO USER-CONTROLLED RESOURCES BY AUTOMATED ASSISTANTS

(71) Applicant: Google Inc., Mountain View, CA (US)

(72) Inventors: Ibrahim Badr, Zurich (CH); Yariv Adan, Cham (CH); Hugo Santos, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/595,004

(22) Filed: May 15, 2017

(51) Int. Cl.
| G06F 15/16 | (2006.01) |
| G06F 15/00 | (2006.01) |
| G10L 15/00 | (2013.01) |
| G06Q 10/00 | (2012.01) |
| G10L 15/22 | (2006.01) |
| H04L 12/00 | (2006.01) |
| G06F 17/28 | (2006.01) |
| G06F 17/30 | (2006.01) |
| G06F 3/16 | (2006.01) |
| G06F 9/54 | (2006.01) |
| G10L 15/18 | (2013.01) |

(Continued)

(52) U.S. Cl.
CPC .............. *G06F 17/28* (2013.01); *G06F 3/167* (2013.01); *G06F 9/54* (2013.01); *G06F 17/3087* (2013.01); *G06F 17/30654* (2013.01); *G06F 17/30684* (2013.01); *G10L 15/1815* (2013.01); *G10L 15/22* (2013.01); *G10L 15/26* (2013.01); *G10L 21/06* (2013.01)

(58) Field of Classification Search
None
See application file for complete search history.

(56) References Cited

U.S. PATENT DOCUMENTS

| 5,533,102 A | 7/1996 | Robinson et al. |
| 5,652,789 A | 7/1997 | Miner et al. |

(Continued)

FOREIGN PATENT DOCUMENTS

| EP | 1672896 | 6/2006 |
| EP | 2528360 | 11/2012 |

OTHER PUBLICATIONS

Orwant, J. "Doppelgänger Goes to School: Machine Learning for User Modeling". Diss. Massachusetts Institute of Technology, 1993; 89 pages.

(Continued)

*Primary Examiner* — Fariba Sirjani
(74) *Attorney, Agent, or Firm* — Middleton Reutlinger

(57) ABSTRACT

Techniques are described herein for allowing automated assistants serving users to access data controlled by others, including resources available to automated assistants serving others. In various implementations, a voice input may be received from a first user. A task request may be recognized from the voice input and analyzed. In response to the analysis, a determination may be made that the task request relates to a second user. An access control list relating to an automated assistant engaged by the second user may be checked to determine whether the first user has appropriate access rights as regards the second user. In response to determining that the first user has appropriate access rights as regards the second user, action may be taken on the task request.

9 Claims, 10 Drawing Sheets

(51) Int. Cl.
*G10L 15/26* (2006.01)
*G10L 21/06* (2013.01)

(56) References Cited

U.S. PATENT DOCUMENTS

| | | | |
|---|---|---|---|
| 5,982,863 A | 11/1999 | Smiley et al. | |
| 6,047,053 A | 4/2000 | Miner et al. | |
| 7,359,496 B2 | 4/2008 | Qian et al. | |
| 7,460,652 B2 | 12/2008 | Chang | |
| 7,853,243 B2 | 12/2010 | Hodge | |
| 7,945,470 B1* | 5/2011 | Cohen | G06Q 10/06 455/433 |
| 8,166,119 B2* | 4/2012 | Ligh | G06F 3/04886 709/206 |
| 8,732,246 B2* | 5/2014 | Jayanthi | 709/205 |
| 8,892,446 B2 | 11/2014 | Cheyer et al. | |
| 9,147,054 B1* | 9/2015 | Beal | G06F 21/32 |
| 9,190,075 B1 | 11/2015 | Cronin | |
| 9,509,799 B1 | 11/2016 | Cronin | |
| 2002/0016729 A1* | 2/2002 | Breitenbach | G06Q 10/06 707/802 |
| 2002/0131565 A1* | 9/2002 | Scheuring | G06Q 10/109 379/88.19 |
| 2003/0073412 A1* | 4/2003 | Meade, II | G08C 17/02 455/70 |
| 2004/0117371 A1 | 6/2004 | Bhide et al. | |
| 2004/0187152 A1* | 9/2004 | Francis | H04L 12/2803 725/58 |
| 2005/0065995 A1* | 3/2005 | Milstein | H04L 29/06 709/202 |
| 2006/0210033 A1 | 9/2006 | Grech et al. | |
| 2006/0253456 A1 | 11/2006 | Pacholec et al. | |
| 2008/0177860 A1* | 7/2008 | Khedouri | G06F 17/30038 709/217 |
| 2009/0210148 A1* | 8/2009 | Jayanthi | G01C 21/26 701/467 |
| 2011/0144980 A1* | 6/2011 | Rysenga | G06Q 10/109 704/201 |
| 2011/0237227 A1* | 9/2011 | Kemery | G06F 21/6218 455/414.1 |
| 2011/0276896 A1* | 11/2011 | Zambetti | H04L 12/1813 715/751 |
| 2012/0222132 A1 | 8/2012 | Burger et al. | |
| 2012/0254966 A1* | 10/2012 | Parker | G06F 9/5027 726/7 |
| 2013/0111487 A1* | 5/2013 | Cheyer | G06F 17/3087 718/102 |
| 2014/0081633 A1 | 3/2014 | Badaskar | |
| 2014/0171133 A1* | 6/2014 | Stuttle | G06F 17/3087 455/466 |
| 2014/0172953 A1* | 6/2014 | Blanksteen | H04W 4/02 709/203 |
| 2014/0207953 A1 | 7/2014 | Beck et al. | |
| 2014/0359717 A1 | 12/2014 | Robertson et al. | |
| 2015/0179000 A1* | 6/2015 | Jayanthi | G01C 21/26 701/32.4 |
| 2015/0185996 A1 | 7/2015 | Brown et al. | |
| 2015/0207799 A1 | 7/2015 | Steiner et al. | |
| 2015/0215350 A1* | 7/2015 | Slayton | H04L 65/403 709/204 |
| 2016/0155442 A1* | 6/2016 | Kannan | G06F 3/167 704/275 |
| 2016/0203002 A1* | 7/2016 | Kannan | G06F 9/4446 715/708 |
| 2016/0212138 A1 | 7/2016 | Lehane | |
| 2017/0054661 A1* | 2/2017 | Golcher Barguil | H04L 51/046 |
| 2017/0091778 A1* | 3/2017 | Johnson | G06Q 10/06311 |
| 2017/0318075 A1 | 11/2017 | Liensberger et al. | |
| 2017/0337184 A1 | 11/2017 | Quah et al. | |

OTHER PUBLICATIONS

International Search Report and Written Opinion of PCT Ser. No. PCT/US2018/032519, 15 pages Aug. 1, 2018.

* cited by examiner

PROVIDING ACCESS TO USER-CONTROLLED RESOURCES BY AUTOMATED ASSISTANTS

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") may provide commands, queries, and/or requests (collectively referred to herein as "queries") using spoken natural language input (i.e. utterances) which may in some cases be converted into text and then processed, and/or by providing textual (e.g., typed) natural language input.

In some cases, automated assistants may include automated assistant "clients" that are installed locally on client devices and that are interacted with directly by users, as well as cloud-based counterpart(s) that leverage the virtually limitless resources of the cloud to cooperate with automated assistant clients respond to users' requests. For example, the automated assistant client may provide, to the cloud-based counterpart(s), an audio recording of the user's voice input (or a text conversion thereof) and data indicative of the user's identity (e.g., credentials). The cloud-based counterpart may perform various processing on the input to return various results to the automated assistant client, which may then provide corresponding output to the user (or take some other action). For the sakes of brevity and simplicity, the term "automated assistant," when described herein as "serving" a particular user, may refer to the automated assistant client installed on the particular user's client device and any cloud-based counterpart that interacts with the automated assistant client to respond to the user's queries. As used herein, the terms "task request" or "request" refer to requests to perform a task, search queries (searches for information), other queries, or any other command or statement from a user directed at an automated assistant to cause the automated assistant to respond.

An automated assistant may have access to publicly-available data such as documents and other information available on the Internet, as well as "user-controlled resources" under the control of a particular user served by the automated assistant. User-controlled resources may be associated with a "user account" of the user, and may be locally accessible from client device(s) operated by the user and/or remotely (e.g., in the so-called "cloud"). User-controlled resources may take various forms, such as a user's calendar, emails, text messages, reminders, shopping lists, search history, photos, documents, sensor data (e.g., position coordinates), content of past human-to-computer dialogs, personal preferences, and so forth.

In some cases, the automated assistant may gain access to user-controlled resources by way of the associated user account. For example, when the user installs or first engages with an automated assistant client on a particular client device, the user may grant the automated assistant permission to access some or all of the user-controlled resources. In other words, the user effectively grants the automated assistant access to user-controlled resources. In some cases, this may include modifying an access control list (or other similar security mechanism) that regulates access to the user-controlled resources.

An automated assistant that serves a first user may not have access to user-controlled resources of another user. For example, the first user may not be able to instruct an automated assistant that serves the first user to add an item to someone else's shopping list, or to determine whether someone else is available for a meeting at a particular time/location. Moreover, some tasks may require engagement by multiple users. For example, if an automated assistant serving a first user does not have access to a second user's schedule, and the first user wishes to determine whether the second user is available at a particular time/location for a meeting, the first user may be required to contact the second user (e.g., by phone or using text messaging) and the second user may confirm availability. This becomes more cumbersome if the first user wishes to schedule a meeting with multiple other users. Additionally, there is not currently a way for a first user to instruct an automated assistant serving the first user to cause an automated assistant serving a second user to proactively engage with the second user, e.g., at a particular time or location.

SUMMARY

Techniques are described herein for allowing automated assistants serving users to (directly or indirectly) access resources controlled by others, including resources available to automated assistants serving others. In various implementations, a first user may provide natural language input (e.g., typed, spoken) to an automated assistant client executing on a first client device (e.g., smart phone, smart watch, stand-alone interactive speaker, etc.) operated by the first user. The natural language input may include a "task request" that seeks access to user-controlled resources of a second user. An access control list may include resources to which the automated assistant serving the second user device has access, as well as at least one or more subsets of those resources to which automated assistants serving other users have access. The automated assistant serving the first user may check (or as described below may have one or more cloud-based "services" check) the access control list associated with the second user to determine whether the first user has appropriate access rights as regards the second user. If the user has appropriate access, then action may be taken in response to the task request (e.g., responded to, undertaken, etc.)

Action may be taken in response to a task request in various ways by various components. In some implementations, an automated assistant serving the first user may access the user-controlled resources the second user, e.g., reading from the second user's user-controlled resources (e.g., obtaining the second user's current position, checking the second user's calendar, etc.) and/or writing to the second user's user-controlled resources (e.g., adding/editing a calendar entry, adding a reminder, adding a shopping list item, etc.). In other implementations, the automated assistant serving the second user may take action in response to the task request. In yet other implementations, one or more cloud-based "services" may action the task request on behalf of either automated assistant. For example, in some implementations, one service may provide access to the second user's calendar, another service may provide access to the second user's shopping list, another service may provide access to the second user's current location, another service may provide access to the second user's reminder list, etc.

In some implementations, taking action on a task request may cause the automated assistant serving second user to proactively engage the second user (e.g., without the second user initiating the human-to-computer dialog), contemporaneously with the first user's task request or at a later time, e.g., in response to one or more events. For example, suppose the first user provides the automated assistant serving the first user the task request, "remind <second user> to pick up milk on the way home from work." Suppose further that the access control list of the second user grants the first user access to the second user's shopping list. An automated assistant serving either user, or a cloud-based service acting on either automated assistant's behalf, may cause "milk" to be added to the second user's shopping list. Additionally, the automated assistant serving the second user may "surface" the reminder to the second user (e.g., by providing audible output such as "<first user> would like you to pick up milk on your way home") in response to one or more signals, e.g., generated by the second user's client device, that suggest the second user is headed home from work. For example, if the current time corresponds to the end of a workday and a position coordinate sensor (e.g., GPS-based) on the second user's client device provides a signal that indicates the second user is travelling home, the automated assistant serving the second user may surface the reminder, e.g., by speaking the reminder to the second user.

Techniques described herein may provide for a number of technical advantages. Enabling a user to interact with an automated assistant, particularly using voice commands, may enable the user to perform various tasks, such as taking a poll, sending a message to other users via their automated assistants, modifying other users' shopping lists/reminder lists/calendars, etc., using fewer inputs. This may benefit users who may have diminished abilities to provide manual input, such as users that are driving, users that have physical disabilities that make entering input manually difficult, etc. Additionally, the user on the other end of the transaction may benefit because their automated assistant may be able to provide them with information from someone else at a more opportune time. For example, in one example described below, an individual may receive (from their automated assistant) a reminder from someone else to pick up something from the store when they are on their way home, rather than simply receiving the message as soon as the sender sent it. This reduces the likelihood that the individual will fail to fulfill the request.

In some implementations, a method performed by one or more processors is provided that includes: receiving a voice input from a first user; recognizing a task request from the voice input; analyzing the task request; in response to the analyzing, determining that the task request relates to a second user and checking an access control list relating to an automated assistant engaged by the second user to determine whether the first user has appropriate access rights as regards the second user; and in response to determining that the first user has appropriate access rights as regards the second user, taking action on the task request.

These and other implementations of technology disclosed herein may optionally include one or more of the following features.

In various implementations, the access control list may indicate access rights regarding one or more services with which the second user has a respective account. In various implementations, the access control list may indicate access rights regarding multiple services with which the second user has respective accounts. In various implementations, the access control list may indicate access rights regarding services selected from the group of: a schedule service, an automated assistant liaison service, a location service, a shopping list service, and a reminder service.

In various implementations, checking the access control list to determine whether the first user has appropriate access rights as regards the second user may include determining that the first user is a member of a first group and determining that the first group has appropriate access rights. In various implementations, taking action on the task request may include reading information from the second user's account with a service. In various implementations, taking action on the task request may include writing information to the second user's account with a service. In various implementations, taking action on the task request may include an automated assistant associated with the first user writing information to the second user's account with a service. In various implementations, taking action on the task request may include an automated assistant associated with the second user writing information to the second user's account with a service.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
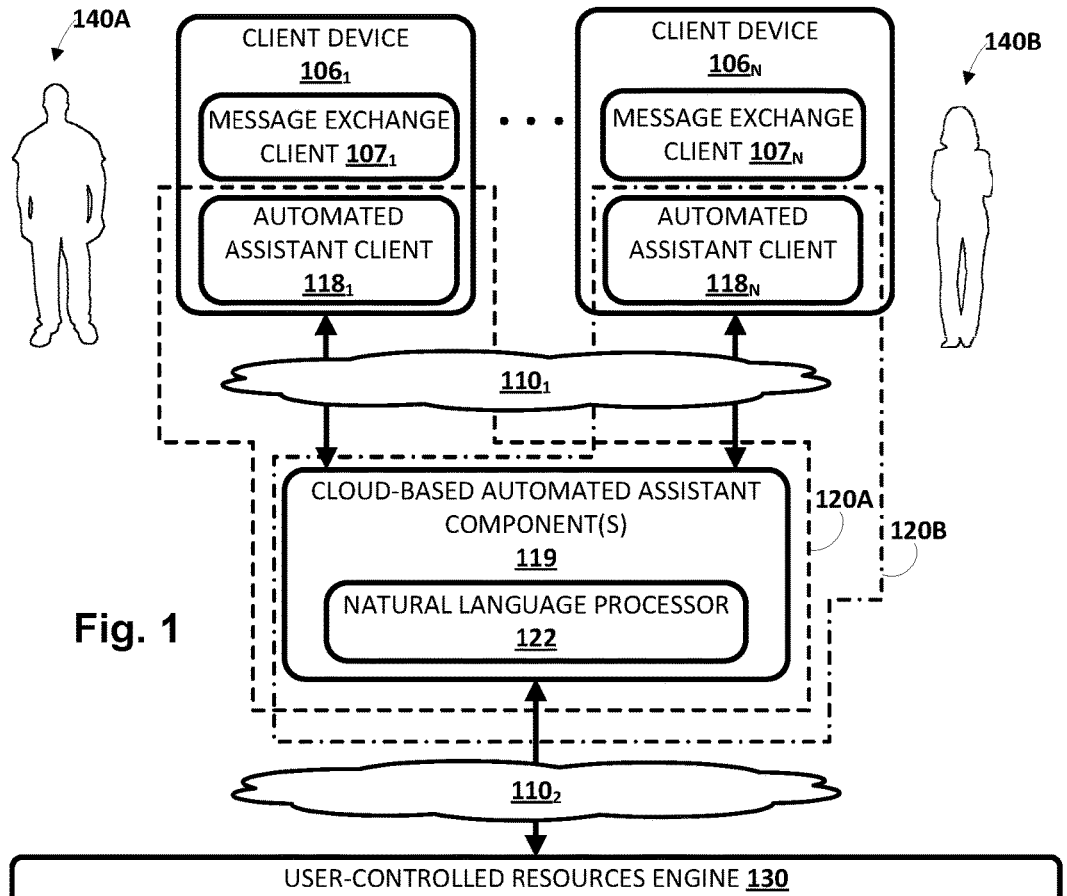
FIG. 1 is a block diagram of an example environment in which implementations disclosed herein may be implemented.
Figure 1:
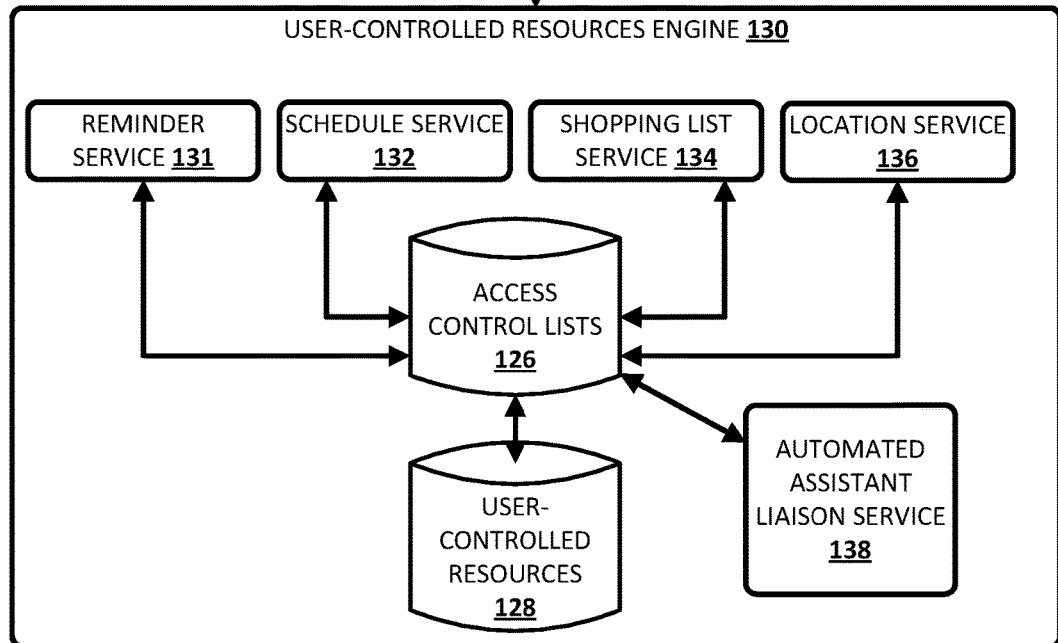

Now turning to FIG. 1, an example environment in which techniques disclosed herein may be implemented is illustrated. The example environment includes a plurality of client computing devices $106_{1-N}$. Each client device 106 may execute a respective instance of an automated assistant client 118. One or more cloud-based automated assistant components 119, such as a natural language processor 122, may be implemented on one or more computing systems (collectively referred to as a "cloud" computing system) that are communicatively coupled to client devices $106_{1-N}$ via one or more local and/or wide area networks (e.g., the Internet) indicated generally at $110_1$.

As noted in the background, an instance of an automated assistant client 118, by way of its interactions with one or more cloud-based automated assistant components 119, may form what appears to be, from the user's perspective, a logical instance of an automated assistant 120 with which the user may engage in a human-to-computer dialog. Two instances of such an automated assistant 120 are depicted in FIG. 1. A first automated assistant 120A encompassed by a dashed line serves a first user 140A operating first client device $106_1$ and includes automated assistant client $118_1$ and one or more cloud-based automated assistant components 119. A second automated assistant 120B encompassed by a dash-dash-dot line serves a second user 140B operating another client device $106_N$ and includes automated assistant client $118_N$ and one or more cloud-based automated assistant components 119. It thus should be understood that each user that engages with an automated assistant client 118 executing on a client device 106 may, in effect, engage with his or her own logical instance of an automated assistant 120. For the sakes of brevity and simplicity, the term "automated assistant" as used herein as "serving" a particular user will refer to the combination of an automated assistant client 118 executing on a client device 106 operated by the user and one or more cloud-based automated assistant components 119 (which may be shared amongst multiple automated assistant clients 118).

The client devices $106_{1-N}$ may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, and/or a wearable apparatus of the user that includes a computing device (e.g., a watch of the user having a computing device, glasses of the user having a computing device, a virtual or augmented reality computing device). Additional and/or alternative client computing devices may be provided.

In some implementations, a given user may communicate with automated assistant 120 utilizing a plurality of client computing devices 106 that collectively from a coordinated "ecosystem" of computing devices. In some such implementations, automated assistant 120 may be considered to "serve" that given user, e.g., endowing automated assistant 120 with enhanced access to user-controlled content (e.g., resources, documents, etc.) for which access is controlled by the "served" user.

For example, in FIG. 1, a user-controlled resources engine 130 may be implemented on one or computing devices (which again may be collectively referred to as a "cloud") to control access to resources controlled by each user. In some implementations, user-controlled resources engine 130 may be operably coupled with one or more computing systems that implement automated assistant 120 via one or more local and/or wide area networks (e.g., the Internet) indicated generally at $110_2$. Additionally or alternatively, user-controlled resources engine 130 may be implemented in whole or in part on the same computing systems that implement automated assistant 120. In some implementations, user-controlled resources engine 130 may include one or more access control lists 126 that govern access to user-controlled resources 128. In some implementations, access control list 126 may indicate access rights regarding one or more services with which each user has a respective account. In various implementations, access control list 126 may indicate access rights regarding multiple services with which each user has respective accounts. Access control lists 126 may take various forms, such as database entries or a list of access control entries, that include indications, for each user, of what content controlled by that user is accessible to others (including the others' automated assistants), how it is accessible (e.g., read, write, etc.), and so forth.

User-controlled resources 128 may include various data associated with each user. This data may include documents associated with the user (and in many cases, with one or more accounts of the user), such as documents the user stores on a so-called "cloud" drive." It may also include emails and other electronic correspondence (e.g., text messages, social media posts, etc.). In some implementations, user-controlled resources 128 may include behavior related to the user's behavior, such as search query history (e.g., search logs), past conversations with an automated assistant 120, and so forth. User-controlled resources 128 may also include other resources associated with a user, such as a calendar, a reminder list, a shopping list, sensor data (e.g., position coordinate data produced by, for instance, a Global Positioning System, or "GPS," sensor), and so forth.

As noted in the background, user-controlled resources 128 associated with a particular user may be associated with a "user account" of the user. In some instances, a user may sign into his or her user account on one or more client devices (e.g., using various credentials such as a username/password, biometrics, etc.), thereby endowing an automated assistant 120 (including the locally-executing client 118 and any online components 119) that serves the user with access to these resources. In some cases, automated assistant 120 may gain access to user-controlled resources 128 by way of the associated user account. For example, when the user installs or first engages with automated assistant client 118 on a particular client device 106, the user may grant automated assistant 120 permission to access some or all of the user-controlled resources 128 controlled by the user. In other words, the user effectively grants automated assistant 120 access to user-controlled resources 128. In some cases, this may include modifying access control list 126 (or other similar security mechanism).

Additionally, in some implementations, a user's account may be linked with (e.g., provide the user with access to) multiple services 130-138 (which will be described in more detail below), such that being logged into the user's account at a client device 106 gives the user's automated assistant 120 access to these services. Additionally or alternatively, the user may have separate accounts with each of these services, and in some cases one or more of these separate accounts may be linked a primary account (e.g., a social network account) of the user. Or, the user may elect to modify access control list 126 to permit, on an individual basis, each separate account associated with each corresponding individual service access to user-controlled resources 128 associated with the user. In some implementations, a separate access control list may be provided for each service.

While user-controlled resources 128 is depicted in FIG. 1 as a single database, this is not to suggest that all user-controlled resources is stored in a single location. To the contrary, in many implementations, user-controlled resources may be stored (or otherwise available) in part on client devices 106 (e.g., sensor signals such as GPS), and/or may be distributed across a variety of cloud-based systems, each which may serve a different purpose (e.g., one set of one or more servers may provide email functionality, another set of one or more servers may provide calendar functionality, etc.).

Each of the client computing devices $106_{1-N}$ may operate a variety of different applications, such as a corresponding one of a plurality of message exchange clients $107_{1-N}$. Message exchange clients $107_{1-N}$ may come in various forms and the forms may vary across the client computing devices $106_{1-N}$ and/or multiple forms may be operated on a single one of the client computing devices $106_{1-N}$. In some implementations, one or more of the message exchange clients $107_{1-N}$ may come in the form of a short messaging service ("SMS") and/or multimedia messaging service ("MMS") client, an online chat client (e.g., instant messenger, Internet relay chat, or "IRC," etc.), a messaging application associated with a social network, a personal assistant messaging service dedicated to conversations with automated assistant 120, and so forth. In some implementations, one or more of the message exchange clients $107_{1-N}$ may be implemented via a webpage or other resources rendered by a web browser (not depicted) or other application of client computing device 106.

As described in more detail herein, automated assistant 120 engages in human-to-computer dialog sessions with one or more users via user interface input and output devices of one or more client devices $106_{1-N}$. In some implementations, automated assistant 120 may engage in a human-to-computer dialog session with a user in response to user interface input provided by the user via one or more user interface input devices of one of the client devices $106_{1-N}$. In some of those implementations, the user interface input is explicitly directed to automated assistant 120. For example, one of the message exchange clients $107_{1-N}$ may be a personal assistant messaging service dedicated to conversations with automated assistant 120 and user interface input provided via that personal assistant messaging service may be automatically provided to automated assistant 120. Also, for example, the user interface input may be explicitly directed to automated assistant 120 in one or more of the message exchange clients $107_{1-N}$ based on particular user interface input that indicates automated assistant 120 is to be invoked. For instance, the particular user interface input may be one or more typed characters (e.g., @AutomatedAssistant), user interaction with a hardware button and/or virtual button (e.g., a tap, a long tap), an oral command (e.g., "Hey Automated Assistant"), and/or other particular user interface input. In some implementations, automated assistant 120 may engage in a dialog session in response to user interface input, even when that user interface input is not explicitly directed to automated assistant 120. For example, automated assistant 120 may examine the contents of user interface input and engage in a dialog session in response to certain terms being present in the user interface input and/or based on other cues. In many implementations, automated assistant 120 may engage interactive voice response ("IVR"), such that the user can utter commands, searches, etc., and the automated assistant may utilize natural language processing and/or one or more grammars to convert the utterances into text, and respond to the text accordingly.

Each of the client computing devices $106_{1-N}$ and automated assistant 120 may include one or more memories for storage of data and software applications, one or more processors for accessing data and executing applications, and other components that facilitate communication over a network. The operations performed by one or more of the client computing devices $106_{1-N}$ and/or by automated assistant 120 may be distributed across multiple computer systems. Automated assistant 120 may be implemented as, for example, computer programs running on one or more computers in one or more locations that are coupled to each other through a network.

Automated assistant 120 (and in particular, cloud-based automated assistant components 119) may include a natural language processor 122 and other components that are not depicted in FIG. 1. In some implementations, one or more of the engines and/or modules of automated assistant 120 may be omitted, combined, and/or implemented in a component that is separate from automated assistant 120.

In some implementations, automated assistant 120 generates responsive content in response to various inputs generated by a user of one of the client devices $106_{1-N}$ during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in response to free-form natural language input provided via one of the client devices $106_{1-N}$. As used herein, free-form input is input that is formulated by a user and that is not constrained to a group of options presented for selection by the user.

As used herein, a "dialog session" may include a logically-self-contained exchange of one or more messages between a user and automated assistant 120 (and in some cases, other human participants in the thread). Automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of automated assistant 120, and so forth.

In some implementations, when automated assistant 120 provides a prompt that solicits user feedback, automated assistant 120 (and in particular, automated assistant client 118) may preemptively activate one or more components of the client device (via which the prompt is provided) that are configured to process user interface input to be received in response to the prompt. For example, where the user interface input is to be provided via a microphone of the client device $106_1$, automated assistant 120 may provide one or more commands to cause: the microphone to be preemptively "opened" (thereby preventing the need to hit an interface element or speak a "hot word" to open the microphone), a local speech to text processor of the client device $106_1$ to be preemptively activated, a communications session between the client device $106_1$ and a remote speech to text processor to be preemptively established, and/or a graphical user interface to be rendered on the client device $106_1$ (e.g., an interface that includes one or more selectable elements that may be selected to provide feedback). This may enable the user interface input to be provided and/or processed more quickly than if the components were not preemptively activated.

Natural language processor 122 of automated assistant 120 processes natural language input generated by users via client devices $106_{1-N}$ and may generate annotated output for use by one or more other components of automated assistant 120. For example, the natural language processor 122 may process natural language free-form input that is generated by a user via one or more user interface input devices of client device $106_1$. The generated annotated output includes one or more annotations of the natural language input and optionally one or more (e.g., all) of the terms of the natural language input.

In some implementations, the natural language processor 122 is configured to identify and annotate various types of grammatical information in natural language input. For example, the natural language processor 122 may include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

In various implementations, user-controlled resources engine 130 may include one or more "services," any of which may be implemented using any combination of hardware or software, that are configured to service requests for particular types of user-controlled resources. For example, in FIG. 1, user-controlled resources engine 130 includes a reminder service 131, a schedule service 132, a shopping list service 134, a location service 136, and an automated assistant liaison service 138. These services are illustrated only as examples, and are not meant to be exhaustive. Moreover, in various implementations, one or more of these services may be implemented separately (as shown in FIG. 1) or as integral parts of a single service.

In various implementations, each service may be configured to service requests from automated assistant 120 for a particular type of data transaction. For example, reminder service 131 may handle requests to view and/or edit data related to users' reminder or tasks lists (which in some cases may be integral parts of a larger calendaring system). Schedule service 132 may handle requests to view and/or edit data related to users' calendars/schedules. Shopping list service 134 may handle requests to view and/or edit data related to users' shopping lists. Location service 136 may handle requests to view data pertaining to user locations. Other possible services not depicted in FIG. 1 include services that handle requests to view and/or edit users' cloud-based documents, services that handle requests to read users' media (e.g., cloud-stored photos, music, movies, etc.), and so forth.

Automated assistant liaison service 138 may be configured to facilitate the exchange of data between individuals by way of their respective automated assistants 120 (synchronously or asynchronously). For example, in many scenarios, a given user may not necessarily need to access data controlled by another user. Instead, the given user may simply want to cause the other user's automated assistant to interact with the other user, e.g., by engaging in a human-to-computer dialog with the other user, soliciting information from the other user (or multiple users in a polling scenario), etc. As was the case with data requests serviced by services 130-136, access control list 126 may also define, for each given automated assistant 120 serving a particular user, permissions governing whether other users' automated assistants 120 can trigger the given automated assistant 120 to take some action, such as proactively initiating a human-to-computer dialog with the particular user served by the given automated assistant 120.

In various implementations, the services 130-138 may handle requests from automated assistant 120 in accordance with permissions indicated in access control lists 126. For example, suppose a first user 140A operating first client device 106$_1$ (and logged into a corresponding account on client device 106$_1$) requests that automated assistant 120 add an entry to a calendar controlled by the first user 140A. In various implementations, the first user's automated assistant 120 may request that schedule service 132 add the calendar entry. Schedule service 132 may determine (or in other implementations, automated assistant 120 may determine), based on information contained in access control lists 126, that it has permission to edit calendar information associated with first user 140A, and thus may take action on the request by adding the entry.

In addition to taking action on a user's request pertaining to the user's own resources, in various implementations, techniques are described herein for taking action on a user's request pertaining to resources controlled by other users. For example, suppose a voice input is received from first user 140A that requests that a reminder be added to a reminder list associated with a second user 140B. That task request may be recognized, e.g., by natural language processor 122, from the voice input. Automated assistant 120 may analyze the task request, e.g., using query processing. In response to the analysis, automated assistant 120 or one or more components of user-controlled resources engine 130 may determine that the task request relates to second user 140B. Accordingly, access control list 126 may be checked in relation to an automated assistant 120 engaged by second user 140B to determine whether first user 140A has appropriate access rights as regards second user 140B (e.g., whether first user 140A has the right to add reminders to a reminder list controlled by second user 140B). In response to determining that first user 140A has appropriate access rights as regards second user 140B, one or more components in FIG. 1, such as automated assistant 120 and/or one or more components of user-controlled resources engine 130, may take action on the task request, e.g., by adding the reminder to the reminder list controlled by second user 140B.

Additionally or alternatively, in various implementations, first user 140A may provide a request that causes (e.g., by way of automated assistant liaison service 138) an automated assistant 120B serving second user 140B (e.g., automated assistant client $118_N$ in combination with one or more cloud-based automated assistant components 119) to engage second user 140B in some sort of dialog. Continuing with the example described above, in some implementations, an automated assistant 120 serving second user 140B may, e.g., at the request of automated assistant liaison service 138, proactively incorporate, into a human-to-computer dialog with second user 140B (i.e., by way of second user 140B interacting directly with automated assistant client $118_N$), an indication that first user 140A is adding a reminder to the reminder list associated with second user 140B. In some implementations, automated assistant 120 may simply notify second user 140B of the addition, e.g., by way of an audible or visual prompt. In other implementations, e.g., where access control list 126 does not already provide first user 140A with permission to add reminders, automated assistant 120 may first solicit permission from second user 140B for first user 140A to add the reminder.

Figure 2A:
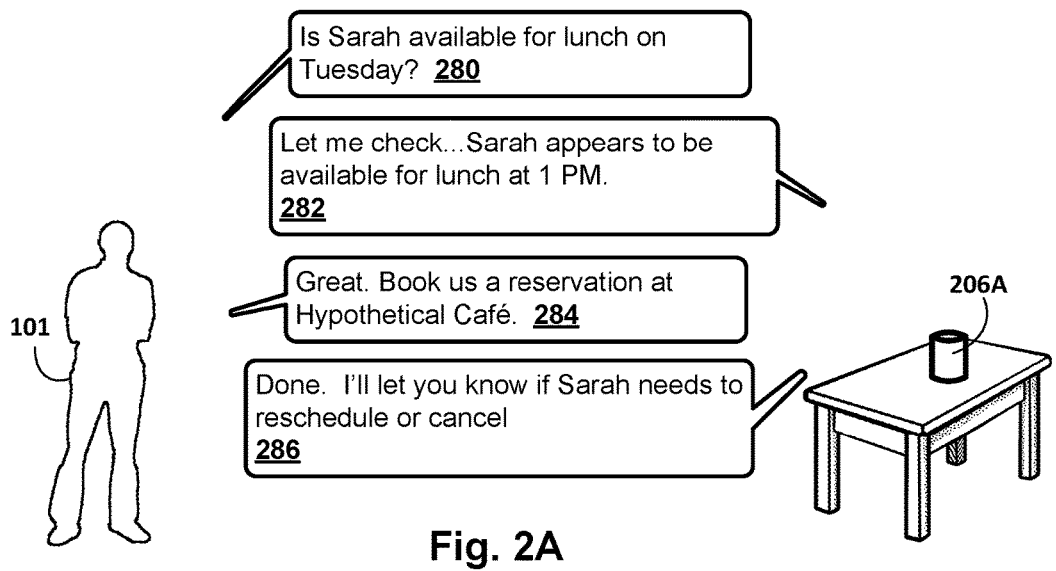
FIGS. 2A, 2B, 3A, 3B, 4A, 4B, 5, 6, 7A, 7B, and 8 depict example dialogs between various users and automated assistants, in accordance with various implementations.

FIG. 2A illustrates an example of a human-to-computer dialog session between user 101 and an instance of automated assistant (120A or B in FIG. 1, not depicted in FIG. 2) that may occur, via the microphone(s) and speaker(s) of a client computing device 206A (depicted as a standalone interactive speaker but this is not meant to be limiting) according to implementations described herein. One or more aspects of automated assistant 120 may be implemented on the computing device 206A and/or on one or more computing devices that are in network communication with the computing device 206A.

In FIG. 2A, user 101 ("Dave") provides natural language input 280 of "Is Sarah available for lunch on Tuesday?" in a human-to-computer dialog session between the user 101 and automated assistant 120. In response to the natural language input 280, automated assistant 120 interacts with user-controlled resources engine 130 to determine whether access control list 126 permits Dave, and more particularly, an automated assistant 120 serving Dave, to read data from Sarah's schedule. For example, Dave's automated assistant 120 may interact with schedule service 132, which may determine whether Dave has appropriate access rights as regards Sarah. Assuming Dave has such rights, schedule service 132 may either permit Dave's automated assistant to analyze Sarah's calendar, or may analyze Sarah's calendar itself. Either way, a determination may be made, e.g., by Dave's automated assistant 120 and/or schedule service 132, that Sarah is available for lunch on Tuesday at 1 PM. Accordingly, Dave's automated assistant 120 (executing on client device 206A) may provide responsive natural language output 282 of "Let me check . . . Sarah appears to be available for lunch at 1 PM." At 284, Dave then responds, "Great. Book us a reservation at Hypothetical Café." Dave's automated assistant 120 performs any processing required to book the reservation (e.g., by interacting with a reservation system associated with the restaurant) and responds, "Done. I'll let you know if Sarah needs to reschedule or cancel."

Figure 2B:
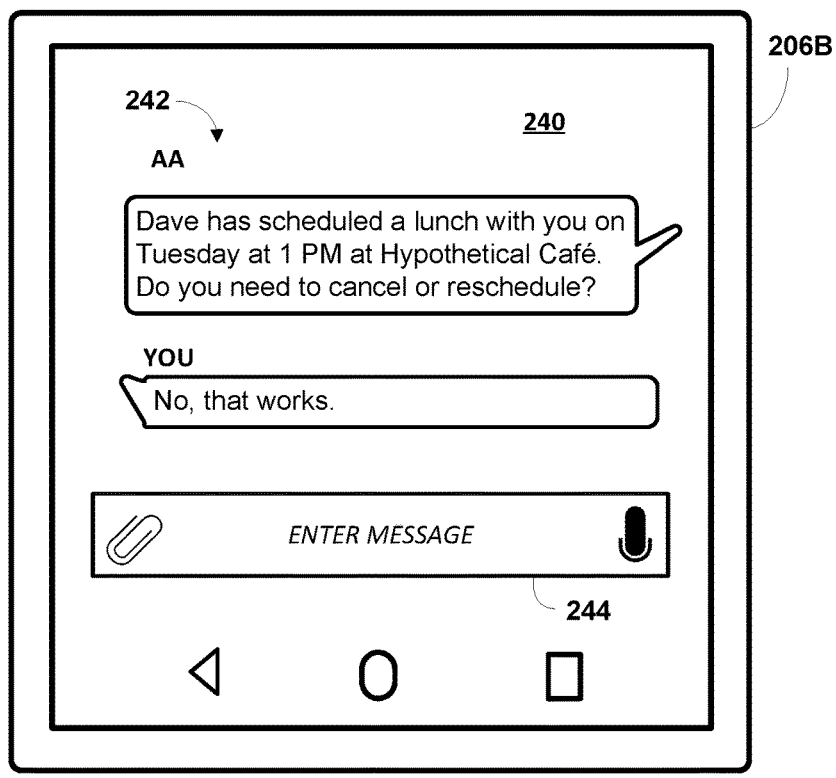

FIG. 2B depicts the same scenario as was depicted in FIG. 2A, except from the perspective of a client device 206B (in the form of a tablet or smart phone but not so limited) operated by Sarah. Client device 206B includes a touch-screen 240, a transcript 242 of a human-to-computer dialog between Sarah and her automated assistant 120 (e.g., rendered in a message exchange client 107), and an input field 244 that may receive text, speech-to-text, or other types of input (e.g., images) from Sarah. In this example, Sarah's automated assistant 120 ("AA" in FIG. 2B and elsewhere herein) provides the following natural language output in response to Dave's successful attempt to schedule a lunch with Sarah by adding an entry to her calendar: "Dave has scheduled a lunch with you on Tuesday at 1 PM at Hypothetical Café. Do you need to cancel or reschedule?" Sarah responds, "No, that works," at which point Sarah's automated assistant 120 may take no further action. However, had Sarah responded in the negative, Sarah's automated assistant 120 could have cancelled the calendar entry added by Dave's automated assistant from her calendar. Additionally, Sarah's automated assistant 120 could have caused (e.g., by way of automated assistant liaison service 138)) Dave's automated assistant 120 to provide output, e.g., via a speaker of client device 206A, that Sarah cancelled the lunch. Additionally or alternatively, Sarah could attempt to reschedule the lunch using techniques similar to those used by Dave when he originally scheduled the lunch.

Figure 3A:
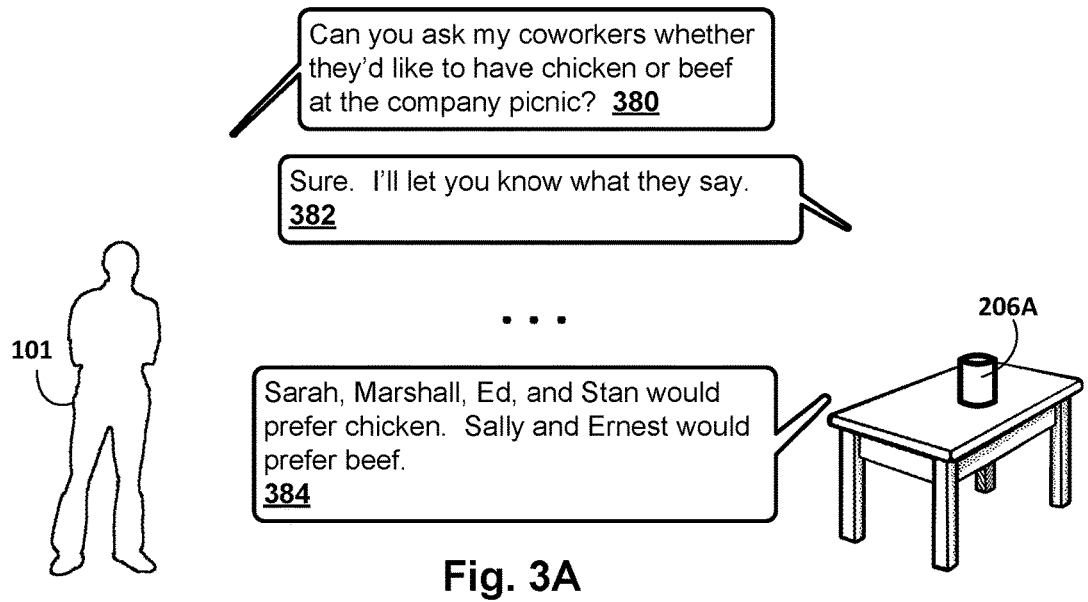

In some implementations, techniques described herein may be used by a single user to poll multiple other individuals, e.g., by way of automated assistant liaison service 138 coordinating communication with the other individuals' automated assistants 120 and collecting the results. FIG. 3A depicts another example dialog between the user "Dave" 101 and automated assistant 120 operating on the computing device 206A during a different session. At 380, the Dave 101 speaks the phrase, "Can you ask my coworkers whether they'd like to have chicken or beef at the company picnic?" At 382 Dave's automated assistant 120 responds, "Sure. I'll let you know what they say." At this point, Dave's automated assistant 120 may interact with various components of user-controlled resources engine 130, such as automated assistant liaison service 138, which may in turn interact with automated assistants 120 that serve individuals known to be Dave's coworkers (which may be set up, by Dave for instance, as a group of Dave's contacts, or may include a group of Dave's social networking contacts who all work for the same employer), in order to solicit answers from the other coworkers. For example, automated assistant liaison service 138 may check access control list 126 to determine whether, for each coworker (or in some cases, for a predefined group of coworker), Dave's automated assistant 120 has permission to trigger the coworkers' respective automated assistants to engage with the coworkers. Assuming the answer is yes, automated assistant liaison service 138 may trigger the coworkers' automated assistants to solicit responses to Dave's question from the coworkers.

Figure 3B:
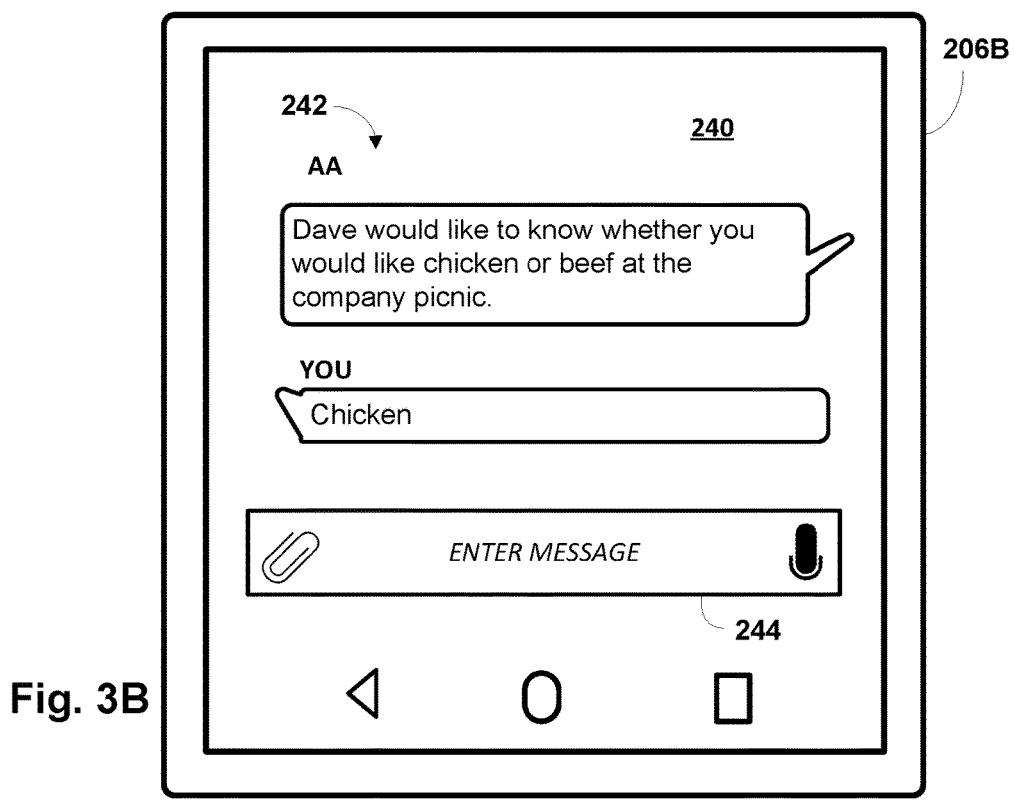

An example of what one of the other coworkers (Sarah from the previous example) may see is depicted in FIG. 3B. On Sarah's client device 206B, Sarah's automated assistant 120, e.g., at the behest of automated assistant liaison service 138, provides the following natural language output: "Dave would like to know whether you would like chicken or beef at the company picnic." Sarah ("YOU") responds, "Chicken." In various implementations, Sarah's response, as well as responses from others of Dave's coworkers, may be collected, e.g., by automated assistant liaison service 138 and/or by Dave's automated assistant 120. In some implementations, automated assistant liaison service 138 and/or Dave's automated assistant 120 may wait until it has responses from all of the other coworkers, or until some predetermined deadline (e.g., one day prior to the company picnic as determined from Dave's schedule), until Dave is presented the results. This is shown in FIG. 3A, when Dave's automated assistant 120 outputs, at 384 (which as indicated by the ellipses occurs sometime later), the polls results, "Sarah, Marshall, Ed, and Stan would prefer chicken. Sally and Ernest would prefer beef." While each coworker received Dave's solicitation as a natural language output, this is not intended to be limiting. In some implementations, one or more of Dave's co-workers could have received the solicitation in a different form, such as a text message, an email (e.g., that linked to a survey with the choices "chicken" and "beef"), etc.

One technical advantage of being able to poll multiple individuals via their respective automated assistants is that instead of Dave receiving multiple response (as would have occurred, for instance, had Dave simply texted his coworkers with the question, "Chicken or beef"), Dave receives from his automated assistant 120 a single communication (at 384) that summarizes the results of the poll. Dave is not inundated with multiple responses, which conserves network and computing resources of client device 206A and reduces distractions. It also reduces the number of interactions Dave must engage in with a client device, which may be beneficial if Dave is driving or otherwise unable to provide numerous inputs.

Figure 4A:
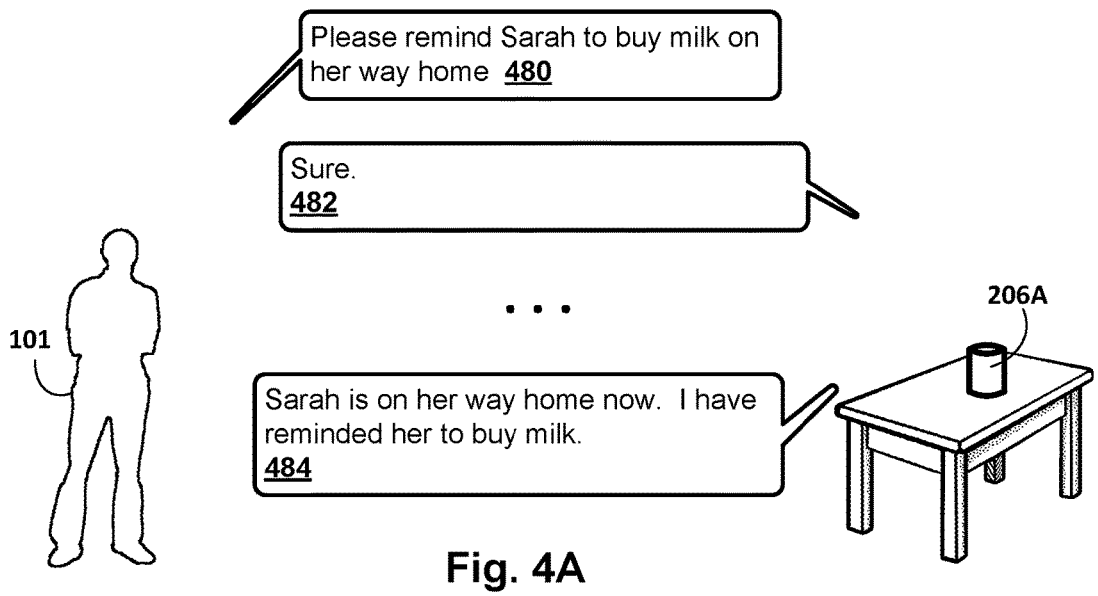
Figure 4B:
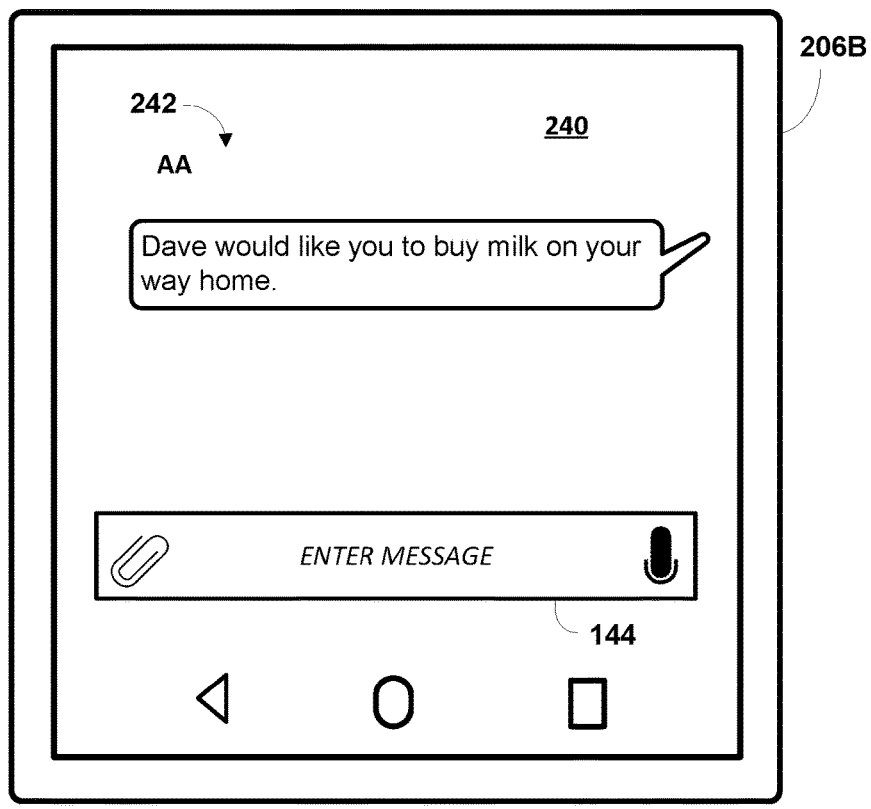

FIG. 4A depicts another dialog between the user Dave 101 and his automated assistant 120 operating on the computing device 206A during a different session, and shows another example of how a user can engage an automated assistant 120 to trigger an automated assistant serving another user to proactively engage that other user. In this example, at 480, Dave 101 provides the natural language input, "Please remind Sarah to buy milk on her way home." Dave's automated assistant 120 responds, "sure." At this point, Dave's automated assistant 120 may engage automated assistant liaison service 138 and/or another automated assistant that serves Sarah, e.g., by way of Sarah's client device 206B, and cause Sarah's automated assistant to provide the output, "Dave would like you to buy milk on your way home," as is depicted in FIG. 4B. In some implementations, this output may be provided on Sarah's client device 206B by Sarah's automated assistant when it is determined, e.g., based on Sarah's location as tracked by location service 136, that Sarah is on her way home. In other implementations, it may be provided to Sarah immediately. In some implementations, if Dave's automated assistant has, by way of access control list 126, permission to obtain Sarah's location from location service 136, Dave's automated assistant 120 may be automatically informed, e.g., by way of location service 136 triggering Dave's own automated assistant, when Sarah is on her way home. In some such implementations, Dave's automated assistant may provide, at 484, output such as "Sarah is on her way home now. I have reminded her to buy milk."

Figure 5:
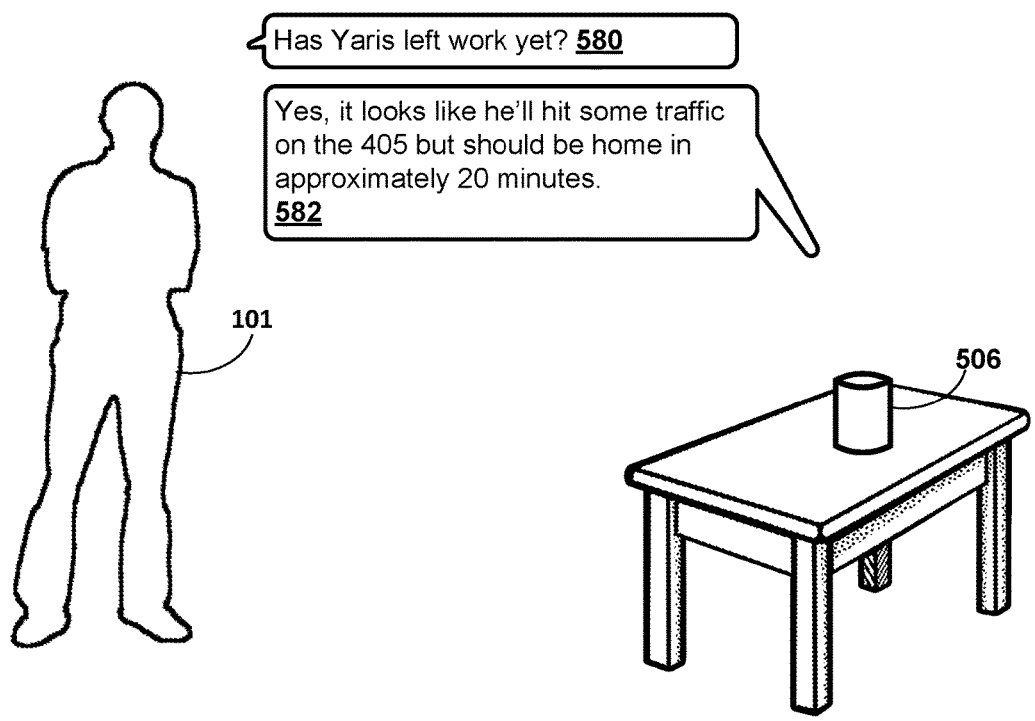

FIG. 5 depicts another example human-to-computer dialog between the user Dave 101 and an instance of automated assistant 120 operating on Dave's client device 206A. Dave asks at 580, "Has Yaris left work yet?" Dave's automated assistant 120 may communicate with user-controlled resources engine 130, and in particular with location service 136. It may be determined, e.g., based on access control list 126, that Dave's automated assistant 120 has permission to obtain Yaris' current location. Accordingly, location service 136 may provide Yaris' current location (which may be determined, for instance, from a last position coordinate received from one or more of Yaris' client devices) to Dave's automated assistant 120. Dave's automated assistant may perform further searching and processing, e.g., of current traffic conditions from a mapping service, and may formulate a response at 582 such as "Yes, it looks like he'll hit some traffic on the 405 but should be home in approximately 20 minutes."

Figure 6:
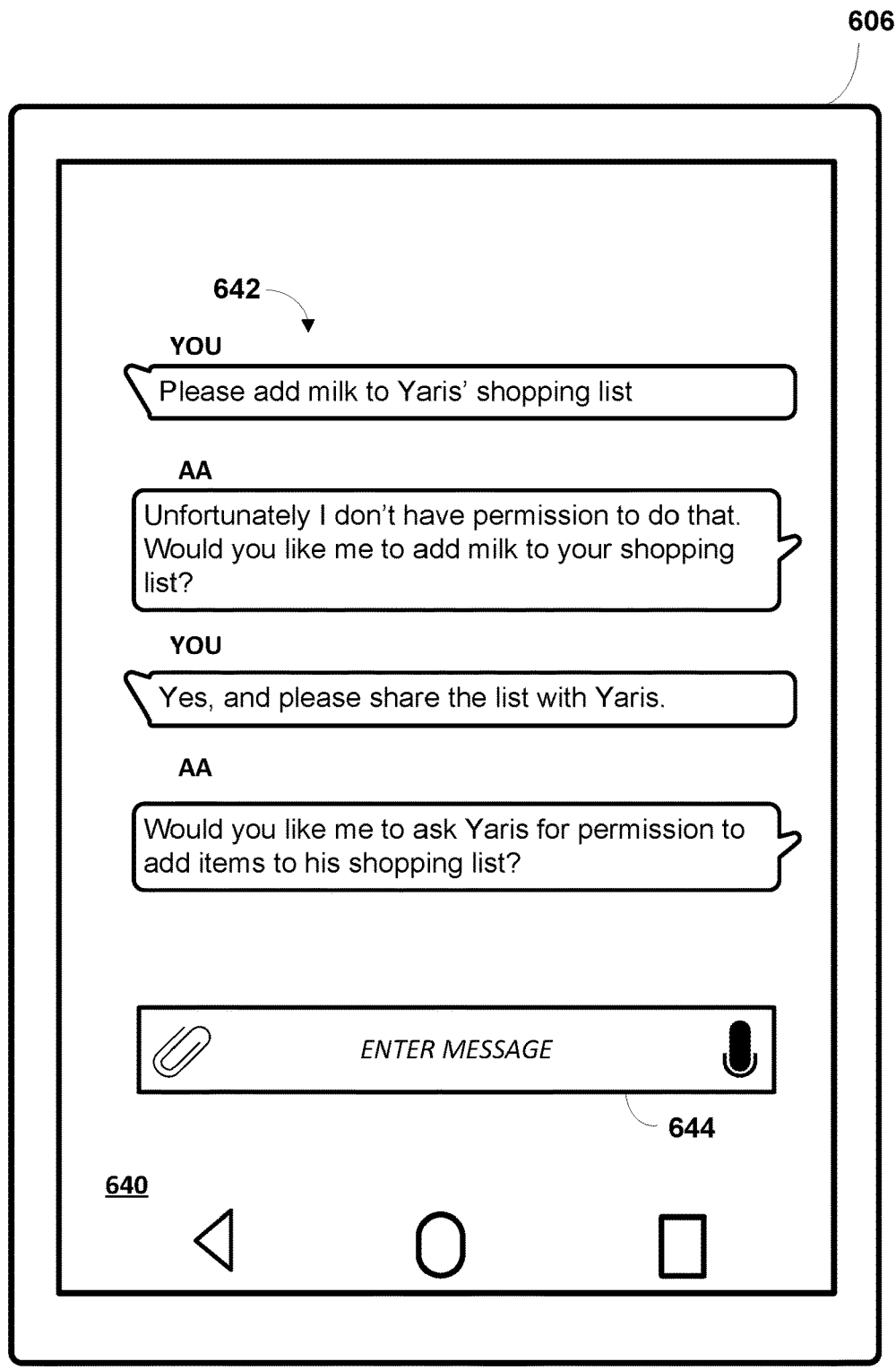

FIG. 6 depicts an example in which a client device 606 in the form of a smart phone or tablet (but that is not meant to be limiting) includes a touchscreen 640. Rendered visually on touchscreen 640 is a transcript 642 of a human-to-computer dialog between a user ("You" in FIG. 6) of client device 606 and an instance of automated assistant 120 ("AA") executing (at least in part) on client device 606. Also provided is an input field 644 in which the user is able to provide natural language content, as well as other types of inputs such as images, sound, etc.

In FIG. 6, the user initiates the human-to-computer dialog session with the question, "Please add milk to Yaris' shopping list." The automated assistant 120 serving the user then engages with user-controlled content engine, and in particular with shopping list service 134, to determine whether, based on access control list 126, the user's automated assistant 120 has permission to add items to Yaris' shopping list. In this example, the user's automated assistant 120 determines that it does not have permission. Accordingly, the user's automated assistant 120 responds, "Unfortunately I don't have permission to do that. Would you like me to add milk to your shopping list?" The user responds "Yes, and please share the list with Yaris." The user's automated assistant may then interact with shopping list service 134 to add milk to the user's own shopping list. The user's automated assistant 120 and/or shopping list service 134 may also update access control list 126 so that an automated assistant serving Yaris now has access to the user's shopping list. While not shown, in some implementations, this may trigger Yaris' automated assistant 120 to inform Yaris that he now has access to the user's shopping list. The user's automated assistant then asks, "Would you like me to ask Yaris for permission to add items to his shopping list?" Should the user respond in the affirmative, the user's automated assistant 120 may engage with automated assistant liaison service 138 to trigger Yaris' automated assistant 120 to ask Yaris if the user can have permission to add items to Yaris' shopping list.

Figure 7A:
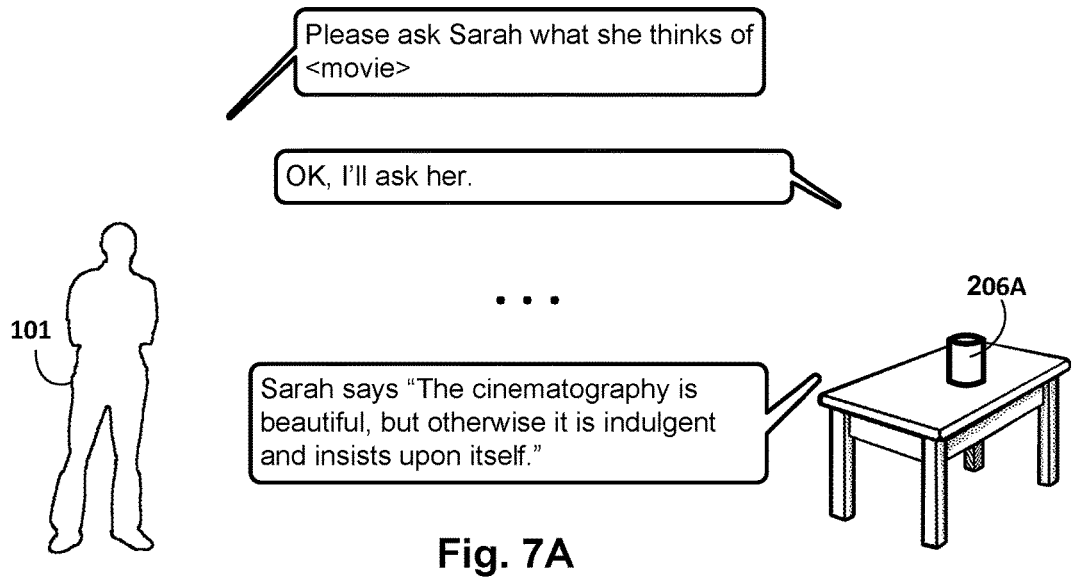
Figure 7B:
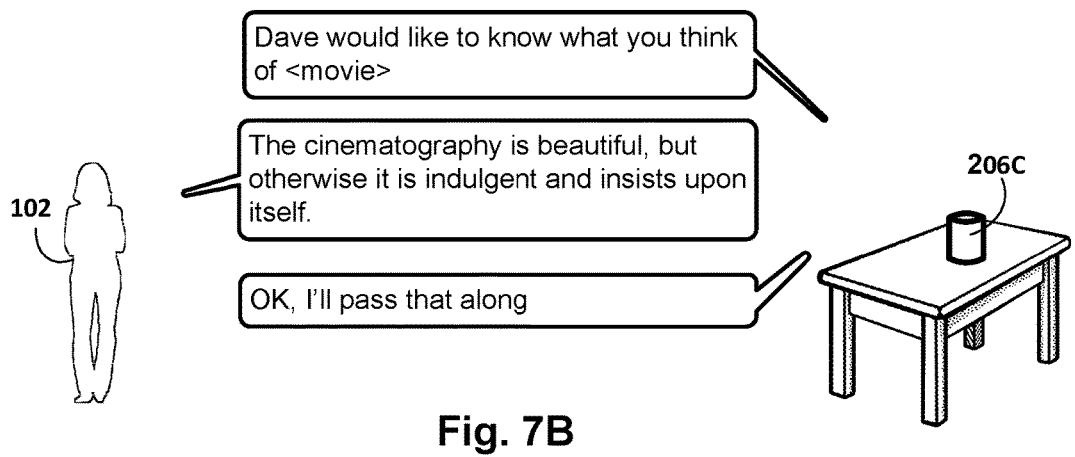

FIGS. 7A and 7B depict another example of how users may, by way of their respective automated assistants, exchange information. In FIG. 7A, a Dave 101 once again interacts with an automated assistant 120 executing at least in part on client device 206A. In this example, Dave 101 provides the natural language input, "Please ask Sarah what she thinks of <movie>." Dave's automated assistant 120 responds, "OK, I'll ask her." Dave's automated assistant 120 then interacts with automated assistant liaison service 138, which determines based on access control list 126 that Dave's automated assistant 120 has permission to trigger Sarah's automated assistant 120 to proactively engage with Sarah.

FIG. 7B depicts one example of how Sarah may be engaged by her automated assistant 120 in this example. Sarah's automated assistant may be executing at least in part on another of Sarah's client devices, 206C, which in FIG. 7B takes the form of a standalone interactive speaker. Sarah's automated assistant 120 audibly outputs the following natural language statement: "Dave would like to know what you think of <movie>." Sarah then responds, "The cinematography is beautiful, but otherwise it is indulgent and insists upon itself." Sarah's automated assistant 120 then states, "OK, I'll pass that along."

Back at FIG. 7A, after some time passes and Sarah provides her opinion about the movie, Dave's automated assistant 120 informs Dave of Sarah's opinion. In this example, the same client device 206A that Dave used to initiate the transaction also provides Dave with this information. However, this is not meant to be limiting. Dave may no longer be in the vicinity of client device 206A, but may be operating another client device (not depicted) that executes at least a part of Dave's automated assistant 120 (e.g., a vehicle computing system). In such a scenario, Dave's other client device may actually output Sarah's opinion, audible or visually.

Figure 8:
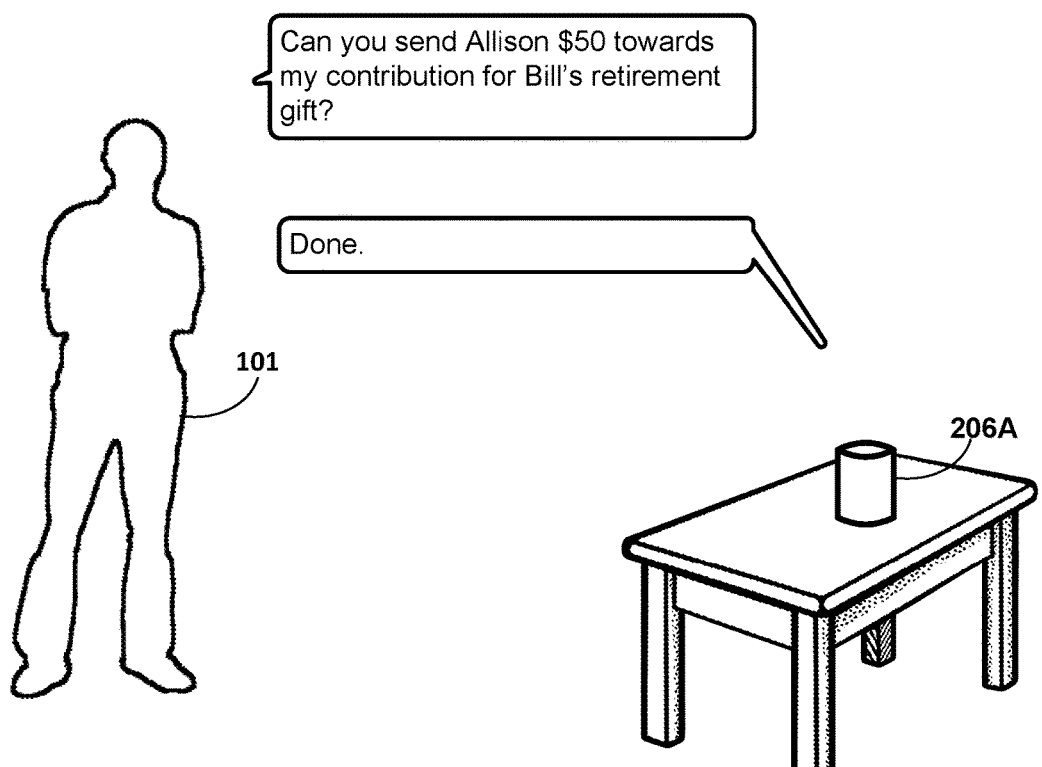

As noted above, the services 130-138 are not an exhaustive list. Other types of services that facilitate other types of transactions, such as payment of funds, are also contemplated. FIG. 8 once again depicts Dave 101 engaging in a human-to-computer dialog with his automated assistant that executes at least in part on client device 206A. In this example, Dave 101 provides the natural language input, "Can you send Allison $50 towards my contribution for Bill's retirement gift?" In response to this input, Dave's automated assistant 120 may engage with a fund payment service (not depicted in FIG. 1) that is connected with Dave's bank account to send the requested funds to another user, Allison. In some implementations, the fund payment service may determine, e.g., based on access control list 126, whether Dave's automated assistant has permission to deposit funds into a bank account controlled by Allison. In other implementations, Dave's automated assistant may simply effect a fund transfer using various conventional online payments systems that facilitate transfer of funds, e.g., via email addresses associated with users.

Figure 9:
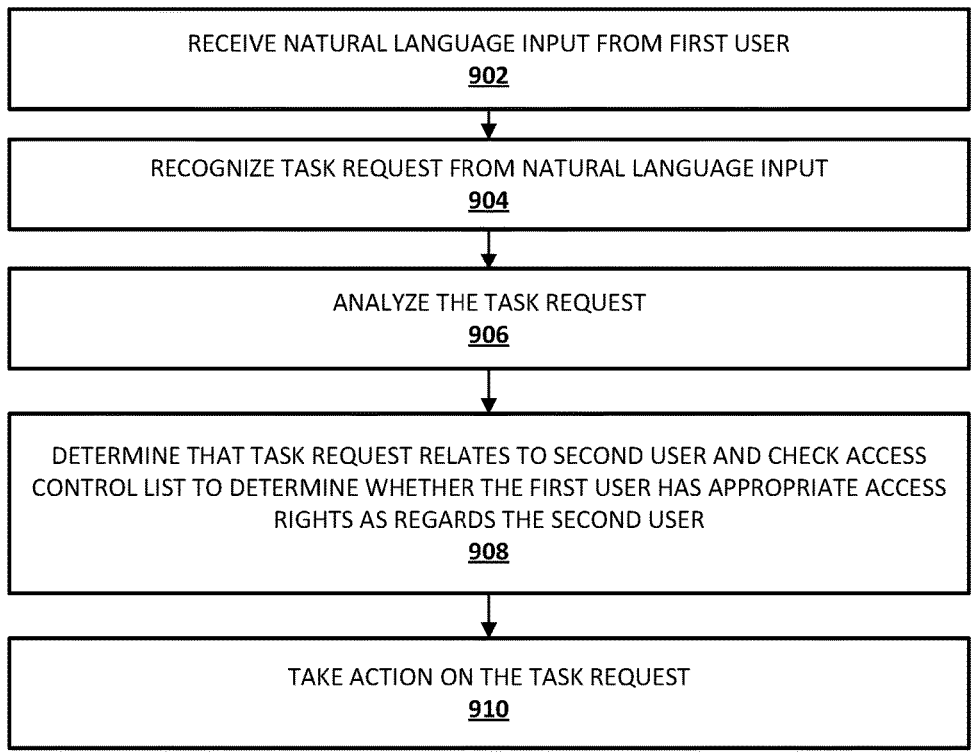
FIG. 9 depicts a flowchart illustrating an example method according to implementations disclosed herein.

FIG. 9 is a flowchart illustrating an example method 900 according to implementations disclosed herein. For convenience, the operations of the flow chart are described with reference to a system that performs the operations. This system may include various components of various computer systems, such as one or more components of automated assistant 120. Moreover, while operations of method 900 are shown in a particular order, this is not meant to be limiting. One or more operations may be reordered, omitted or added.

At block 902, the system may receive a natural language input from a first user. For example, the first user may provide speech input that is converted to text, e.g., at automated assistant client 118 and/or by one or more cloud-based automated assistant components 119. Additionally or alternatively, the first user may provide natural language input in textual form, e.g. by way of message exchange client 107 or another similar application.

At block 904, the system may recognize a task request from the voice input received at block 902, and at block 906, the system, e.g., by way of natural language processor 122 and/or other cloud-based automated assistant components 119, may analyze the task request (e.g., add annotations, pronoun resolution, entity identification, etc.).

At block 908, and in response to the analysis, the system may determine that the task request relates to a second user and check access control list 126 (which as noted above relates to an automated assistant engaged by the second user) to determine whether the first user has appropriate access rights as regards the second user for action to be taken on at least part of the task request. In some implementations, permissions may be checked on an individual user basis. In some implementations, the system may determine whether the first user has appropriate access rights as regards the second user by determining that the first user is a member of a first group and determining that the first group has appropriate access rights as regards the second user. In various implementations, a task request may include multiple sub tasks or queries, some of which for which permission is governed by access control list 126 and other for which no permission is required. For example, suppose a user submits the task query, "Please add a Tuesday lunch meeting on Ruby's calendar, and then send her a text message about the meeting." Adding an entry to Ruby's calendar may require permission via access control list 126, but sending a generic text message may not. Accordingly, in some implementations, automated assistant 120 may determine portions of task requests that require permissions and portions that do not, and may only consult access control list 126 when necessary.

At block 910, the system may, in response to determining that the first user has appropriate access rights as regards the second user at block 908, take action on the task request. For example, in some implementations, taking action on the task request may include reading information from the second user's account (e.g., from user-controlled resources 128) with a service (e.g., one or more of services 130-138). In some implementations, taking action on the task request may include writing information to the second user's account with a service. In some implementations, this reading and/or writing may be performed by an automated assistant associated with (e.g., serving) the first user and/or an automated assistant associated with (e.g., serving) the second user.

Figure 10:
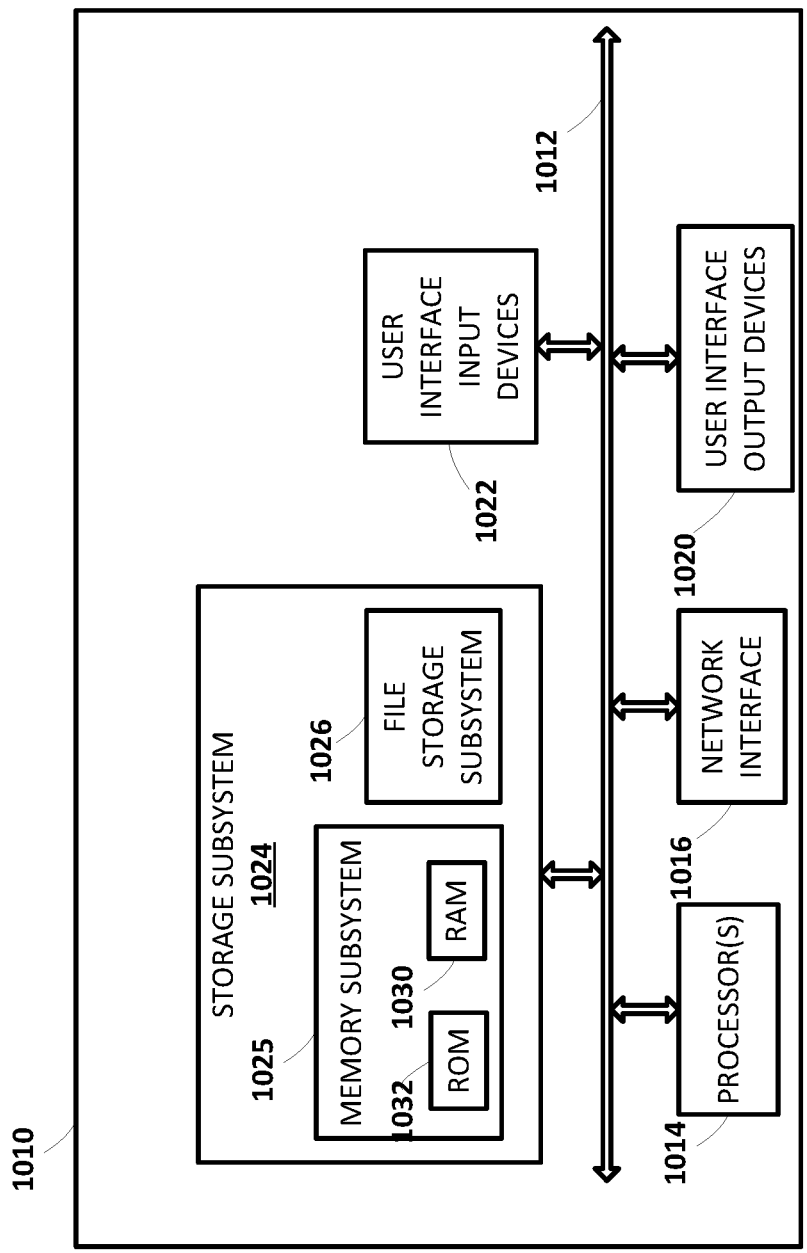
FIG. 10 illustrates an example architecture of a computing device.

FIG. 10 is a block diagram of an example computing device 1010 that may optionally be utilized to perform one or more aspects of techniques described herein. In some implementations, one or more of a client computing device, user-controlled resources engine 130, and/or other component(s) may comprise one or more components of the example computing device 1010.

Computing device 1010 typically includes at least one processor 1014 which communicates with a number of peripheral devices via bus subsystem 1012. These peripheral devices may include a storage subsystem 1024, including, for example, a memory subsystem 1025 and a file storage subsystem 1026, user interface output devices 1020, user interface input devices 1022, and a network interface subsystem 1016. The input and output devices allow user interaction with computing device 1010. Network interface subsystem 1016 provides an interface to outside networks and is coupled to corresponding interface devices in other computing devices.

User interface input devices 1022 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1010 or onto a communication network.

User interface output devices 1020 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1010 to the user or to another machine or computing device.

Storage subsystem 1024 stores programming and data constructs that provide the functionality of some or all of the modules described herein. For example, the storage subsystem 1024 may include the logic to perform selected aspects of the method of FIG. 9, as well as to implement various components depicted in FIG. 1.

These software modules are generally executed by processor 1014 alone or in combination with other processors. Memory 1025 used in the storage subsystem 1024 can include a number of memories including a main random access memory (RAM) 1030 for storage of instructions and data during program execution and a read only memory (ROM) 1032 in which fixed instructions are stored. A file storage subsystem 1026 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1026 in the storage subsystem 1024, or in other machines accessible by the processor(s) 1014.

Bus subsystem 1012 provides a mechanism for letting the various components and subsystems of computing device 1010 communicate with each other as intended. Although bus subsystem 1012 is shown schematically as a single bus, alternative implementations of the bus subsystem may use multiple busses.

Computing device 1010 can be of varying types including a workstation, server, computing cluster, blade server, server farm, or any other data processing system or computing device. Due to the ever-changing nature of computers and networks, the description of computing device 1010 depicted in FIG. 10 is intended only as a specific example for purposes of illustrating some implementations. Many other configurations of computing device 1010 are possible having more or fewer components than the computing device depicted in FIG. 10.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method comprising:
    executing a respective automated assistant client on each of at least two client computing devices communicatively coupled via one or more networks with an automated assistant, wherein the automated assistant is cloud-based and wherein the automated assistant is further communicatively coupled to a user-controlled resources engine that includes a plurality of services accessible to a plurality of users of the automated assistant, each of the plurality of users having one or more accounts with one or more of the plurality of services;
    receiving a voice input from one of the plurality of users at an input device of a first client computing device operated by the first user;

performing automatic voice recognition on the voice input;

recognizing a task request from an output of the automatic voice recognition;

analyzing the task request to identify that the task request seeks access to user-controlled resources of a second user of the plurality of users, the second user being associated with a mobile second client computing device;

analyzing the task request to identify a geographic constraint and a time constraint imposed by the task request;

checking an access control list relating to the plurality of services of the user-controlled resources engine to determine whether the first user has appropriate access rights as regards the second user for action to be taken on at least a portion of the task request;

determining that the first user has appropriate access rights as regards the second user for action to be taken on the portion of the task request;

reading information from one or more accounts of the second user to which the first user has appropriate access rights including an account of the second user with a location service that makes available, upon request, a position of the second user provided by the mobile second client computing device;

obtaining a current position of the second user from the account of the second user with the location service;

verifying that the current position of the second user satisfies the geographic constraint;

verifying that a current time satisfies the time constraint;

causing the automated assistant to engage in a natural language human-to-computer dialog with the second user via the automated assistant client operating on the mobile second client computing device at the current position and the current time; and conveying the portion of the task request to the second user via an output component of the mobile second client computing device.

2. The method of claim 1, wherein the access control list further indicates access rights regarding services selected from the group of: a schedule service, an automated assistant liaison service a shopping list service, and a reminder service.

3. The method of claim 1, wherein checking the access control list comprises determining that the first user is a member of a first group and determining that the first group has appropriate access rights.

4. A cloud-based system comprising one or more processors and memory operably coupled with the one or more processors, wherein the memory stores instructions that, in response to execution of the instructions by one or more processors, cause the one or more processors to execute an automated assistant to which a respective automated assistant client on each of at least two client computing devices is communicatively coupled via one or more networks, wherein the automated assistant is further communicatively coupled to a user-controlled resources engine that includes a plurality of services accessible to a plurality of users of the automated assistant, each of the plurality of users having one or more accounts with one or more of the plurality of services wherein the automated assistant is configured to perform the following operations:

receiving a voice input from a first user of the plurality of users at an input device of a first client computing device operated by the first user;

performing automatic voice recognition on the voice input;

recognizing a task request from an output of the automatic voice recognition;

analyzing the task request to identify that the task request seeks access to user-controlled resources of a second user of the plurality of users, the second user being associated with a mobile second client computing device;

analyzing the task request to identify a geographic constraint and a time constraint imposed by the task request;

checking an access control list relating to the plurality of services of the user-controlled resources engine to determine whether the first user has appropriate access rights as regards the second user for action to be taken on at least a portion of the task request;

determining that the first user has appropriate access rights as regards the second user for action to be taken on the portion of the task request;

reading information from one or more accounts of the second user to which the first user has appropriate access rights including an account of the second user with a location service that makes available, upon request, a position of the second user provided by the mobile second client computing device;

obtaining a current position of the second user from the account of the second user with the location service;

verifying that the current position of the second user satisfies the geographic constraint;

verifying that a current time satisfies the time constraint;

engaging in a natural language human-to-computer dialog with the second user via the automated assistant client operating on the mobile second client computing device at the current position and the current time; and conveying the portion of the task request to the second user via an output component of the mobile second client computing device.

5. The system of claim 4, wherein the access control list further indicates access rights regarding services selected from the group of: a schedule service, an automated assistant liaison service, a shopping list service, and a reminder service.

6. The system of claim 4, wherein checking the access control list comprises determining that the first user is a member of a first group and determining that the first group has appropriate access rights.

7. At least one non-transitory computer-readable medium comprising instructions that, in response to execution of the instructions by one or more processors, cause the one or more processors to execute an automated assistant that serves a first user by performing the following operations in an environment in which a respective automated assistant client executes on each of at least two client computing devices communicatively coupled via one or more networks with an automated assistant, wherein the automated assistant is cloud-based and wherein the automated assistant is further communicatively coupled to a user-controlled resources engine that includes a plurality of services accessible to a plurality of users of the automated assistant, each of the plurality of users having one or more accounts with one or more of the plurality of services:

receiving a voice input from a first user of the plurality of users at an input device of a first client computing device operated by the first user;

performing automatic voice recognition on the voice input;

recognizing a task request from an output of the automatic voice recognition;

analyzing the task request to identify that the task request seeks access to user-controlled resources of a second user of the plurality of users, the second user being associated with a mobile second client computing device;

analyzing the task request to identify a geographic constraint and a time constraint imposed by the task request;

checking an access control list relating to the plurality of services of the user-controlled resources engine to determine whether the first user has appropriate access rights as regards the second user for action to be taken on at least a portion of the task request;

determining that the first user has appropriate access rights as regards the second user for action to be taken on the portion of the task request;

reading information from one or more accounts of the second user to which the first user has appropriate access rights including an account of the second user with a location service that makes available, upon request, a position of the second user provided by the mobile second client computing device;

obtaining a current position of the second user from the account of the second user with the location service;

verifying that the current position of the second user satisfies the geographic constraint;

verifying that a current time satisfies the time constraint;

causing the automated assistant to engage in a natural language human-to-computer dialog with the second user via the automated assistant client operating on the mobile second client computing device at the current position and the current time; and conveying the portion of the task request to the second user via an output component of the mobile second client computing device.

8. The at least one non-transitory computer-readable medium of claim 7, wherein the access control list further indicates access rights regarding services selected from the group of: a schedule service, an automated assistant liaison service, a shopping list service, and a reminder service.

9. The at least one non-transitory computer-readable medium of claim 7, wherein checking the access control list comprises determining that the first user is a member of a first group and determining that the first group has appropriate access rights.

* * * * *